Nov. 30, 1965 E. R. HOLMSTROM ETAL 3,220,901
VINYL SPONGE LAMINATE
Filed Feb. 6, 1963
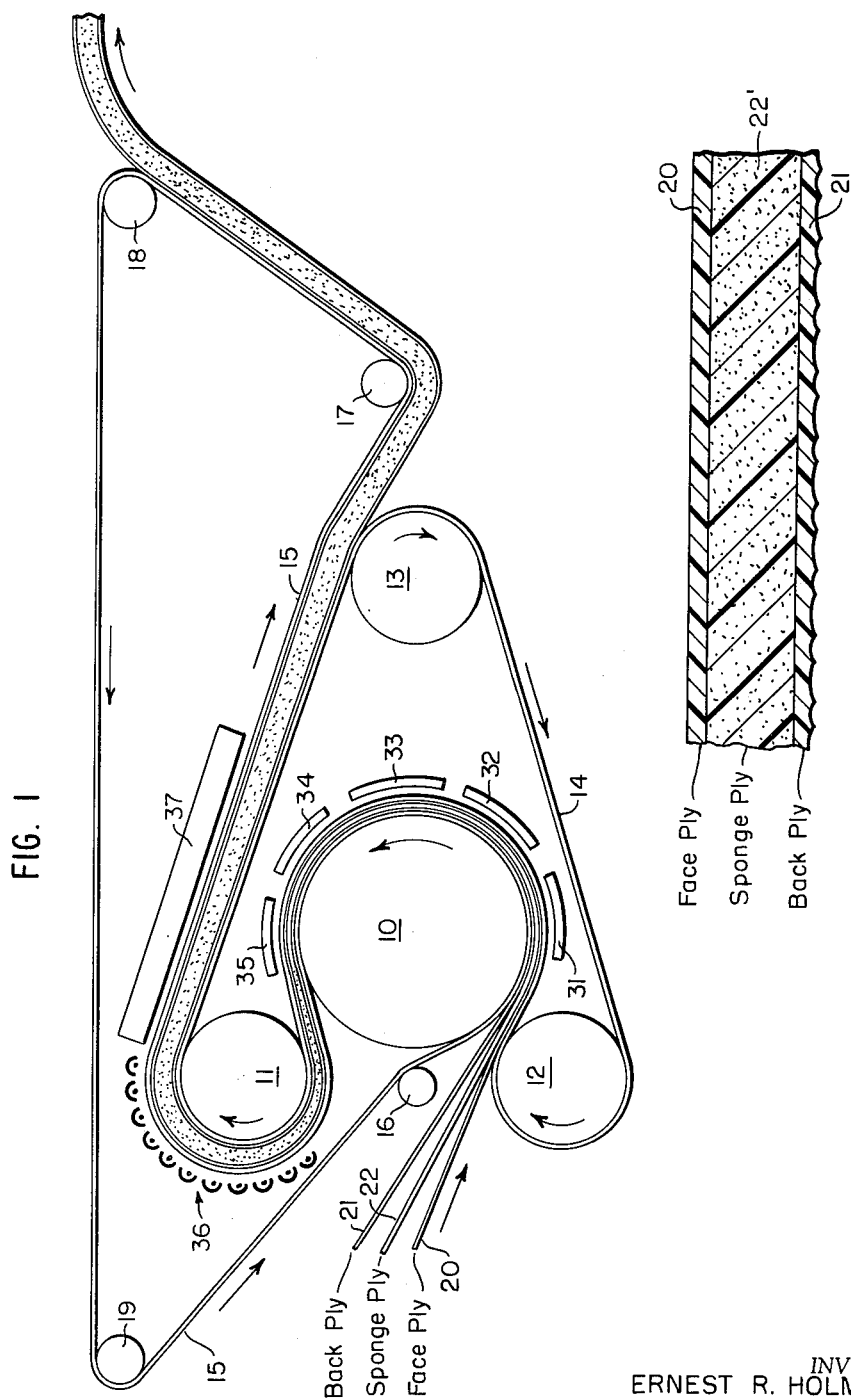
INVENTORS
ERNEST R. HOLMSTROM
DAVID K. SLOSBERG
MERRILL M. SMITH
BY
ATTORNEYS 3,220,901
VINYL SPONGE LAMINATE
Ernest R. Holmstrom, Morrisville, David K. Slosberg, Yardley, and Merrill M. Smith, Morrisville, Pa., assignors to American Biltrite Rubber Co., Inc., Chelsea, Mass., a corporation of Delaware
Filed Feb. 6, 1963, Ser. No. 256,571
5 Claims. (Cl. 156—79)

This invention comprises a new and improved process of making vinyl sponge laminate and includes within its scope the novel product produced thereby, a product characterized by substantial cushioning property with a minimum of bulk.

The general object of the invention is the production of a cushion type of flooring presenting a wear-resisting and preferably ornamental surface ply of vinyl compound permanently and securely laminated to an underlying cushion ply of vinyl sponge. We have discovered that the desired results may be achieved by first forming a permanent lamination of solid vinyl plies, one only containing a blowing agent, and then subjecting the laminated plies to heat at a temperature above the critical blowing temperature. The laminating step may be readily effected under pressure and heat below blowing temperature and the subsequent blowing step is carried out while the expansion of the sponge-forming ply is confined and controlled by one or more of the contiguous plies of dimensionally stable sheet material.

An essential characteristic of the process is that the primary lamination of the solid elastomeric plies should be completed at a relatively low temperature and the sponge-forming step delayed until after the conclusion of the laminating step, and then carried out at a relatively higher temperature. For example, the laminating step may be carried out at about 325° F. and the subsequent sponge-forming step at about 360° F.

A preferred type of sponge laminate comprises two plies of solid vinyl compound containing between them a co-extensive sponge ply. This may be produced in accordance with the process of our invention by interleaving a vinyl ply containing a blowing agent between face and back plies of solid vinyl compound, laminating the three plies together and subsequently conducting the laminated plies through a heating zone at a temperature above the critical blowing point and thus converting the intermediate ply to sponge consistency while confined between the solid face and back plies.

An important feature of our process is that the sponging step is carried out while the stock is completely supported by and between a metal pressure band and a cooperating band of woven fabric such as duck or canvas. Since the blowing occurs at a temperature well above the plastic stage of the vinyl lamination, an unsupported vinyl stock would be otherwise subject to objectionable distortion and shrinkage.

These and other features and characteristics of our invention will be best understood and appreciated from the following description of preferred apparatus for carrying out the process together with a specimen of one type of its product, selected for purposes of illustration and shown in the accompanying drawings, in which:

FIG. 1 is a diagrammatic view of the apparatus, and
FIG. 2 is a sectional view of the product.

The invention will first be described as it is carried out in producing the laminate shown in FIG. 2 in which is included a wear-resisting face ply of marbleized vinyl sheeting 20, an intermediate sponge ply 22' and a back ply 21 which has a roughened surface impressed and molded from woven fabric. The product has an overall thickness of about ⅛ inch and is made conveniently in widths of about 40 inches.

The apparatus as shown in FIG. 1 includes a large steam heated drum 10, a driven upper roll 11, a lower roll 12 and a tension roll 13. An endless steel pressure band 14 passes in a generally triangular path about a substantial portion of the drum 10, then about the top roll 11, the tension roll 13 and the bottom roll 12 by which it is guided into a bight with the center drum. The tension roll is maintained continuously under outward pressure by hydraulic means not shown, so that the tension band 14 will exert a continuous pressure of from 5 to 70 pounds per square inch upon vinyl sheets introduced between it and the drum 10.

The apparatus also includes an endless fabric band 15 of duck or canvas which is trained to run next to the circumference of the drum 10 and in supporting contact with the back ply. The fabric band 15 is directed by a guide roller 16 into the bight of the drum and the pressure band. It is advanced with the product to a guide roll 17 and then to a stripping roll 18 by which it is removed from the now-cooled product and directed back to a guide roll 19 and again to the guide roll 16.

Three vinyl plies are directed into the bight of the heated drum 10 and band 14 and are carried about a substantial arcuate portion of the drum between the steel pressure band 14 and the fabric band 15. The face ply 20 enters the bight of the drum 10 in the lower position with the sponge ply 21 superposed above it and the back ply 22 uppermost. As before stated the back ply 21 is in direct contact with the fabric band 15 and the face ply in direct contact with the steel pressure band 14. This has a ground and highly polished face which imparts the desired smooth surface texture to the face ply while the fabric band 15 impresses a woven textile-like pattern to the back ply.

In practice the drum 10 is steam heated to about 325° F., the bottom roll 12 to about 320° F., and the top roll 11 to about 360° F. Supplemental segmental heaters 31–35 are arranged concentrical to the drum 10 in close proximity to the pressure band 14 as it moves with the drum. A bank of radiant heaters 36 is disposed about a portion of the circumference of the top roll 11 and an elongated zone heater is arranged in close proximity to the product as it leaves the top roll 11 and is carried between the pressure band 14 and the textile band 15 to the tension roll 13. The supplementary heaters 31–35 may be individually regulated so that the three plies in passing about the drum 10 are heated to the point of plasticity and permanently laminate together. This step takes place at a temperature below the critical point of activating the blowing agent. As the laminated material comes within range of heater 35 and the bank of radiant heaters 36 the temperature of the product is raised above this critical point or to about 360° F. whereupon the sponge ply 21 is gradually converted to the desired sponge texture. The blowing step may continue while the product is passing the zone heater 37 but thereafter the temperature is rapidly dropped and the complete product cools and hardens, though still supported between the steel pressure band 14 and the fabric band 15 until it has passed beyond the tension roll 13. It is then directed by the guide roll 17 and passes to the stripper roll 18 while the fabric band is still embedded therein. At this point it is sufficiently hardened so that the fabric band 15 may be stripped from the product without danger of distortion.

The three plies 20, 21 and 22 may be prepared in conventional manner on three-roll or four-roll calenders. The calendering temperature is about 300° F. which is, of course, well below the temperature required to blow azodicarbonimide (the blowing agent). Resin and plasticizers are selected for good processing at this relatively low calendering temperature.

The *face ply* may be of marbleized vinyl sheeting (gauge about 0.02", width 40"). The filler content may be slightly lower and the plasticizer content higher than commercial flooring stock to give the finished product greater resilience.

The *back ply* is identical in composition and thickness to the face ply. This prevents different shrinkage rates that would be encountered in dissimilar stocks, sometimes resulting in curling.

The center or sponge ply is vinyl sheeting calendered to the same thickness as the other plies. It is typified by the following formula:

| | |
|---|---:|
| Polyvinyl chloride, specific viscosity .31 (0.4% solution in nitrobenzene at 25° C.) | 56.50 |
| Dioctyl phthalate | 18.61 |
| Butyl benzyl phthalate | 6.64 |
| Epoxidized soya bean oil | 2.66 |
| Kempore SD, 50% dispersion of azodicarbonimide | 2.25 |
| ABC–50 [1] | 1.13 |
| ABC–1 [2] | .29 |
| Stearic acid | .29 |
| Calcium carbonate | 11.30 |
| Titanium dioxide | .33 |
| | 100.00 |

[1] ABC–50 is a solid, finely divided complex bimetallic salt possessing lubricating properties.
[2] ABC–1 is an inhibited liquid zinc compound with auxiliary modifiers and contains no lead or cadmium.
Both above are proprietary materials of Advance Div., Carlisle Chemical Co.

The speed of the three plies through the illustrated apparatus is about five feet per minute. In FIG. 1 it is suggested that the blow operation starts as the stock passes the segmental heater 35 and approaches the top roll 11 but satisfactory results are secured when temperatures are regulated so that blowing starts about half way round the roll 11. The operation is substantially completed under the action of the radiant heaters 36. The sponge ply will increase in thickness to a degree proportional to the concentration of blowing agent and other variables in the formula.

The last few feet of travel on the pressure band 14 is devoted to gradual cooling of the laminate. It is desirable to avoid undue pressure or bending of the stock before cooling as otherwise the cell structure of the sponge ply is impaired.

It will be understood that the pressure of the steel band 14 drops to zero at its points of tangency with the heated drum 10 and the top roll 11. Accordingly the blowing step is carried out under conditions of relatively low pressure. This is important, otherwise, the desired closed-cell structure is destroyed or collapse of all cells may occur.

While the laminate is not under appreciable pressure during the blowing operation, it is being supported, or rather fixed in position, by its tack to the steel band and by the duck band which is embedded in the back ply. The duck is dimensionally stable at sponging temperature and in conjunction with the steel band it prevents the normal distortion of the laminate that would occur if the laminate were blown by a simple oven procedure, without support.

In carrying out the process as above explained the face ply 20 remains in fixed position on the steel band 14 until it has cooled enough to permit stripping of the laminate when it reaches the tension roll 13 at the rear of the machine. In the last few feet of travel on the band 14 the product is cooled and hardened so that bending or pressure has no detrimental effect thereon.

The plies 20–21–22 may be treated successfully in thickness of .02", although we have found that a single sponge ply does not work well if made too thin. The back and face plies may be varied in thickness to any desired degree with due care as to limiting heat transfer to the center sponge ply.

For the face ply a clear vinyl compound may be used with or without printed or other type of surface decoration. Metallic and other colored granules may be included therein. The face ply may be composed of several clear and opaque films or, if desired, spatter or terrazzo effects may be obtained therein.

It is contemplated that our novel process may be carried out with the elimination of the face ply in producing a product with the sponge ply exposed. This can be used for lamination to other types of material or as an underlayment.

The back ply may be eliminated and the product used with the sponge ply in direct contact with the floor or other substrate, or both back and face plies could be eliminated for the manufacture of an unsupported sponge product. Further, if desired, permanent fabric or felt back could be substituted for the vinyl back ply.

While our novel process is carried out to the best advantage in continuous fashion with the assistance of apparatus of the "Rotocure" type, it may be also operated intermittently with the assistance of flat bed press machinery. This would involve laminating the product below blowing temperature and supporting it in such a manner as to prevent distortion without substantial pressure during a subsequent blowing step. It is also possible to carry out our process using two steel bands in the illustrated machine rather than one steel band and one of textile fabric.

Variations in formulae will readily occur to those skilled in the art. For example a possible alternate to the calendered sponge ply would be a plastisol or organosol coating on a vinyl substitute. This could be gelled or fused at a temperature below decomposition of the blowing agent and laminated in the described manner. The use of other resinous plastics having similar properties to those of the vinyl compounds would be within the scope of our invention.

Having thus disclosed our invention and described in detail the preferred manner of carrying out our novel process, we claim as new and desire to secure by Letters Patent:

1. The process of making a vinyl sponge laminate comprising the steps of:
   confining a vinyl ply containing a blowing agent between a face and back vinyl ply of similar composition and thickness;
   confining the plies so disposed between first and second cooperating pressure bands of dimensionally stable material, the first band adapted to exert a continuous relatively high pressure of from 5 to 70 lbs. per square inch against the plies to effect the lamination of said plies and the first pressure band characterized by a smooth surface in contact with the surface of the face ply while the second pressure band is characterized by a roughened surface in contact with the surface of the back ply;
   advancing said bands of interposed plies through a first heating zone of relatively low temperature sufficient to effect a softening and a lamination of said plies at said high pressure, but at a temperature insufficient to activate the blowing agent, thereby forming a gas retentive laminate;
   advancing the laminated plies through a second heating zone of relatively high temperature sufficient to activate the blowing agent and to convert the ply carrying the blowing agent to a sponge consistency while the laminated plies are combined between said pressure bands at a relatively low pressure, with the second pressure band exerting a relatively low pressure against the plies, the low pressure being sufficient to support and confine the heat softened plies but insufficient to prevent the formation of the sponge ply.

2. The process of making vinyl sponge laminate comprising the steps of:

confining at least two plies of solid vinyl compound of which only one contains a blowing agent between first and second cooperating pressure bands of dimensionally stable material, said bands disposed in an S shape about a relatively large diameter first roller and a relatively small diameter second roller, the first band disposed in an endless manner in a generally triangular path about the first and second roller and a tension roller;

advancing the said bands and the interposed plies at least partially about the surface of the first roller and through a first heating zone; and adjusting the tension roller so that the first pressure band exerts a continuously relatively high pressure of from about 5 to 70 pounds per square inch upon the interposed plies and against the second pressure band and the surface of the first roller, while the plies are heated to a relatively low temperature insufficient to activate the blowing agent, but sufficient to effect a softening and lamination of the interposed plies thereby creating sufficient heat and pressure to laminate the ply into a gas retentive laminate;

advancing the laminated ply at least partially about the surface of the second roller and through a second heating zone, the second band now disposed on the outside of the laminated plies and the first band now disposed against the inside surface of the second roller with the second band exerting a relatively low pressure sufficient to confine and support the heat softened laminated plies against the surface of the second roller, but insufficient to prevent the formation of the vinyl sponge, while heating the laminated plies to a relatively high temperature above the temperature required to activate the blowing agent thereby converting the laminated ply containing the blowing agent into a sponge consistency, the laminated plies in advancing from the first to second rollers passing through a point of zero tangency with the heating of the plies to a relatively high temperature occurring after the plies have passed the point of tangency;

cooling the laminated sponge ply and stripping the cooperatng pressure bands from the surface of the laminated sponge ply.

3. The process described in claim 2 wherein the second pressure band is composed of a woven fabric which impresses a woven surface pattern onto the vinyl ply in contact therewith.

4. The process described in claim 2 wherein the ply containing the blowing agent is confined between a face and back ply of similar composition and thickness.

5. The process described in claim 2 which includes regulating the relatively high temperature of the second heating zone so that the blowing agent is activated between the point of tangency and a position of about halfway around the second roller.

References Cited by the Examiner
UNITED STATES PATENTS

| | | |
|---|---|---|
| 2,288,054 | 6/1942 | Walton. |
| 2,816,852 | 12/1957 | Banks _____ 161—254 X |
| 2,901,774 | 9/1959 | Pooley. |
| 2,956,310 | 10/1960 | Roop et al. |
| 2,970,345 | 2/1961 | Wangner. |
| 3,016,317 | 1/1962 | Brunner _____ 161—161 X |
| 3,048,510 | 8/1962 | Wisotzky _____ 161—254 X |
| 3,093,525 | 6/1963 | Wilson et al. |

EARL M. BERGERT, *Primary Examiner.*